(12) United States Patent
Staudt et al.

(10) Patent No.: US 11,806,951 B2
(45) Date of Patent: Nov. 7, 2023

(54) METHOD FOR PRODUCING A STRUCTURAL SUBASSEMBLY AND STRUCTURAL SUBASSEMBLY

(71) Applicant: Bayerische Motoren Werke Aktiengesellschaft, Munich (DE)

(72) Inventors: Bernhard Staudt, Munich (DE); Tobias Preuss, Munich (DE); Torsten Flemming, Roehrmoos (DE); Florian Spirkl, Bodenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/602,615

(22) Filed: May 23, 2017

(65) Prior Publication Data
US 2017/0252987 A1 Sep. 7, 2017

Related U.S. Application Data

(63) Continuation of application No. PCT/EP2015/075244, filed on Oct. 30, 2015.

(30) Foreign Application Priority Data

Nov. 25, 2014 (DE) ..................... 10 2014 224 040.9

(51) Int. Cl.
*B29C 70/48* (2006.01)
*B29L 31/30* (2006.01)
(Continued)

(52) U.S. Cl.
CPC ...... *B29C 70/48* (2013.01); *B29K 2105/0809* (2013.01); *B29L 2012/00* (2013.01); *B29L 2031/30* (2013.01); *B29L 2031/3055* (2013.01)

(58) Field of Classification Search
CPC ....... B29C 70/48; B29C 70/44; B29C 43/183; B29C 45/14467; B29C 45/14475; B29C 70/304
See application file for complete search history.

(56) References Cited

U.S. PATENT DOCUMENTS 2,079,393 A * 5/1937 Benge ................... B29C 33/485
285/133.4
2,082,611 A * 6/1937 Benge .................. B29D 23/008
285/133.11
(Continued)

FOREIGN PATENT DOCUMENTS

DE         102 14 779 C1    11/2003
DE     10 2007 026 453 A1   12/2008
(Continued)

OTHER PUBLICATIONS

English translation of Chinese-language Office Action issued in counterpart Chinese Application No. 201580050158.2 dated Mar. 21, 2019 (three (3) pages).
(Continued)

*Primary Examiner* — Matthew J Daniels
(74) *Attorney, Agent, or Firm* — Crowell & Moring LLP

(57) ABSTRACT

A method is provided for producing a structural subassembly, in particular for a motor vehicle, including at least one first profile component of fiber-reinforced plastic and at least one connecting component for producing a node connection of the first profile component with a further profile component. The method includes the following steps: providing a mold with at least one mold half, which has a cavity that corresponds substantially to the first profile component to be produced and includes at least one integrally molded-on connecting component; introducing a one- or multi-piece textile reinforcing material, in particular a textile semifinished product, into the mold; introducing a flowable plastics
(Continued)

material into the mould, in order to impregnate the textile reinforcing material; and curing and/or cooling the plastics material.

8 Claims, 2 Drawing Sheets

(51) Int. Cl.
*B29L 12/00* (2006.01)
*B29K 105/08* (2006.01)

(56) References Cited

U.S. PATENT DOCUMENTS

| | | | | |
|---|---|---|---|---|
| 2,751,237 | A * | 6/1956 | Conley | B29C 53/76 |
| | | | | 285/133.4 |
| 2,878,038 | A * | 3/1959 | Noland | B29C 53/588 |
| | | | | 285/133.4 |
| 2,995,781 | A * | 8/1961 | Sipler | B29C 70/446 |
| | | | | 156/305 |
| 3,468,346 | A * | 9/1969 | Smith | B29D 23/008 |
| | | | | 138/109 |
| 3,586,058 | A * | 6/1971 | Ahrens | F16L 41/02 |
| | | | | 138/103 |
| 3,765,979 | A * | 10/1973 | Thomas | B29C 53/824 |
| | | | | 285/133.11 |
| 4,106,797 | A * | 8/1978 | Michael | B29C 53/76 |
| | | | | 156/173 |
| 4,124,678 | A * | 11/1978 | Stroupe | B29C 70/02 |
| | | | | 264/314 |
| 4,457,542 | A * | 7/1984 | Shaefer | F16L 43/008 |
| | | | | 285/133.11 |
| 4,601,770 | A * | 7/1986 | Ulrich | F16L 47/32 |
| | | | | 156/173 |
| 4,675,965 | A * | 6/1987 | Offringa | B29D 23/008 |
| | | | | 285/133.11 |
| 4,724,115 | A | 2/1988 | Freeman | |
| 4,740,346 | A * | 4/1988 | Freeman | B29C 33/10 |
| | | | | 264/102 |
| 4,883,550 | A * | 11/1989 | Overath | B29B 15/10 |
| | | | | 264/494 |
| 5,431,870 | A * | 7/1995 | Andre | B29D 12/00 |
| | | | | 264/258 |
| 5,567,509 | A | 10/1996 | Gautier | |
| 5,624,519 | A * | 4/1997 | Nelson | B62K 19/22 |
| | | | | 264/258 |
| 5,857,690 | A | 1/1999 | Gueugneaud | |
| 6,803,007 | B2 | 10/2004 | Meggiolan | |
| 2018/0243957 | A1 * | 8/2018 | Hernandez Hernandez | B29C 45/14614 |

FOREIGN PATENT DOCUMENTS

| | | | |
|---|---|---|---|
| DE | 10 2008 046 991 A1 | 3/2010 | |
| DE | 10 2010 023 669 A1 | 12/2011 | |
| EP | 0 243 751 A2 | 11/1987 | |
| JP | 11-20031 * | 6/1997 | B29C 70/16 |
| WO | WO 2012/062391 A1 | 5/2012 | |

OTHER PUBLICATIONS

International Search Report (PCT/ISA/210) issued in PCT Application No. PCT/EP2015/075244 dated Jan. 14, 2016 with English translation (Four (4) pages).
German-language Written Opinion (PCT/ISA/237) issued in PCT Application No. PCT/EP2015/075244 dated Jan. 14, 2016 (Five (5) pages).
German-language Search Report issued in counterpart German Application No. 10 2014 224 040.9 dated Apr. 2, 2015 with partial English translation (Thirteen (13) pages).
Chinese-language Office Action issued in counterpart Chinese Application No. 201580050158.2 dated Aug. 2, 2018 with English translation (13 pages).

* cited by examiner

METHOD FOR PRODUCING A STRUCTURAL SUBASSEMBLY AND STRUCTURAL SUBASSEMBLY

CROSS REFERENCE TO RELATED APPLICATIONS

This application is a continuation of PCT International Application No. PCT/EP2015/075244, filed Oct. 30, 2015, which claims priority under 35 U.S.C. § 119 from German Patent Application No. 10 2014 224 040.9, filed Nov. 25, 2014, the entire disclosures of which are herein expressly incorporated by reference.

BACKGROUND AND SUMMARY OF THE INVENTION

The invention relates to a method for producing a structural subassembly, particularly for a motor vehicle, having at least one first profile component of fiber-reinforced plastic and at least one connecting component for producing a node connection of the first profile component with a further profile component. The invention further relates to a structural subassembly, particularly for a motor vehicle, having at least one first profile component of fiber-reinforced plastic and at least one connecting component for producing a node connection between the at least first profile component and a further profile component.

For producing light and simultaneously stable and weight-bearing vehicle structures (such as vehicle body components), profile components of fiber-reinforced plastics are currently used, which are produced, for example, by injection or infusion methods. After their production, the profiles are connected with one another or with further adjoining structural components. The connection is usually achieved by a node connection of several mutually glued-together or screwed-together individual parts. The profiles to be connected can, for example, be enclosed between at least two shells. The shells consist of metallic materials, such as aluminum, steel, etc. or of polymeric materials, such as plastic, and, depending on the material, are produced by various established production methods. The profile components and the connecting components are subsequently joined.

In contrast to this state of the art, the invention provides a process for producing a structural subassembly, and a structural subassembly respectively, which is distinguished by lower mounting expenditures as well as a simplified production.

For this purpose, a method according to the invention has the following steps:
  a) Providing a mold having at least one mold half, which has a cavity which corresponds essentially to the first profile component to be produced with at least one connecting component molded on in one piece;
  b) placing a single-piece or multi-piece textile reinforcing material, particularly of a textile semi-finished product, in the mold;
  c) placing a flowable plastic material in the mold in order to saturate the textile reinforcing material; and
  d) hardening and/or cooling the plastic material.

Therefore, according to the invention, when producing the first profile component, at least one connecting component of the node connection is produced in one piece with the profile component in a single production process. For this purpose, the mold has a cavity that is close to the final contour and which largely corresponds to the profile component to be produced including the connecting component and therefore requires no or only little post-processing of the obtained structural subassembly. In contrast to conventional production methods, the number of individual processes for producing the structural subassembly can be reduced by way of the process according to the invention. The mounting expenditures for a subsequent connection of several profile components are also lower, because a positioning and fastening can be eliminated for at least one connecting component. This is advantageous particularly in the case of arrangements with limited accessibility. Furthermore, the use of glue and a resulting undesirable reduction of mechanical assembling properties can be avoided, such as a lower overall rigidity, which may be the result of the use of glue with a low e-module.

According to a preferred embodiment, the textile reinforcing material has a first textile semi-finished product for the profile component as well as at least a second textile semi-finished product for the connecting component, which are in mutual contact in the mold. The current semi-finished products can therefore be used at least for the profile component. By means of the arrangement of the semi-finished products with respect to one another, a particularly stable connection of the profile component and the connecting component can be achieved during the subsequent introduction of the plastic material.

The textile semi-finished products are, for example, preferably so-called fiber preforms, which may be constructed as a braid, a woven, an interlayed scrim, an embroidered fabric or other fiber fabrics made of glass fibers, carbon fibers or aramid fibers.

In particular, the textile semi-finished products are mutually connected by the plastic material. The connecting component is therefore resin-connected directly to the profile component during the introduction of the plastic material and subsequent hardening and/or cooling.

The connecting component preferably has a shell part for the node connection. One or more additional profile components can then be placed in this shell part, and the connection can be completed by use of further shells.

In order to achieve a good impregnation capability of the textile reinforcing material, the cavity advantageously has a defined sprue system.

In a first process variant, the process step c) takes place by an infusion method, particularly in a vacuum. For this purpose, the textile semi-finished products are placed in the mold half, a fluid- and gas-tight foil serving as the mold counterpart. The mold is evacuated, and the plastic material is transported through the cavity via a vacuum.

Likewise, the mold can have two mold halves, which form a cavity in the closed state.

Preferably, the process step c) then takes place by an injection method, the so-called Resin Transfer Molding (abbreviated RTM). Here, the plastic material which, in the case of a duroplastic material, is also called resin, is injected into the closed mold under pressure and saturates the textile reinforcing material previously placed in the mold.

As an alternative, a so-called laminating process or pressing method, particularly a liquid resin press molding, is also contemplated.

The above-mentioned object is also achieved by a structural subassembly of the initially mentioned type, in which the connecting component is produced in one piece with the first profile component of fiber-reinforced plastic. As a result, the number of individual processes for producing the structural subassembly can be reduced. The mounting expenditures are also less in comparison with the state of the art, because at least one connecting component is already connected with the profile component.

During the production of the structural subassembly, the connecting component is preferably directly connected with the profile component. A particularly stable connection is thereby achieved.

Furthermore, all further developments and advantages mentioned with respect to the method according to the invention naturally also apply to the structural subassembly according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
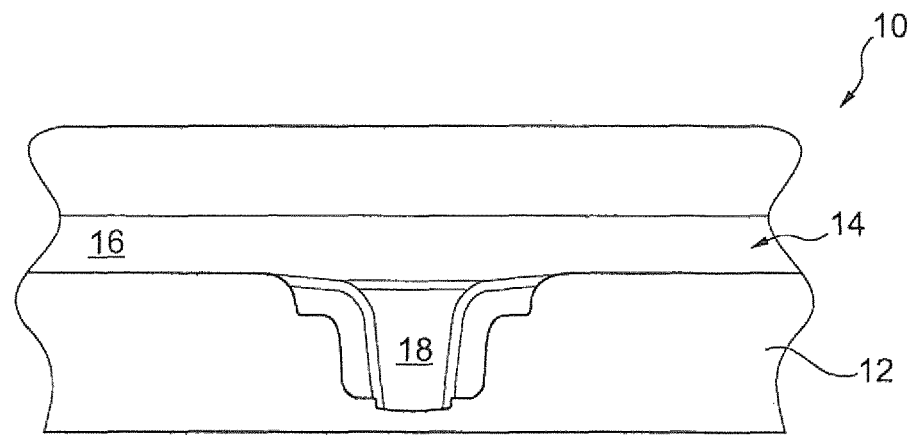
FIG. 1 is a schematic top view of a molding tool half used in the case of an exemplary method according to the invention.

FIG. 1 schematically illustrates a mold 10 for producing a structural subassembly of fiber-reinforced plastic. The mold 10 has a lower mold half 12 and an upper mold half not shown in the figures for reasons of clarity. The mold 10 has a cavity 14, which is formed by corresponding recesses in the top mold half as well as the bottom mold half 12 and includes an oblong area 16 as well as an adjoining half-shell-type area 18.

Figure 4:
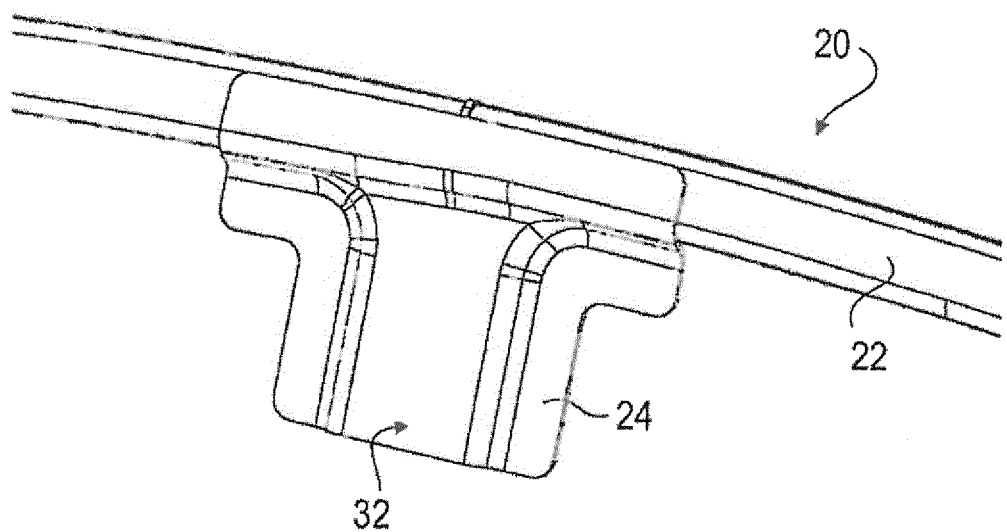
FIG. 4 is a perspective view of a structural subassembly according to an embodiment of the invention.

The cavity 14 therefore corresponds to the final contour of the structural subassembly 20 to be produced, which is illustrated in FIG. 4 and includes a first profile component 22 (corresponding to the oblong area 16 of the cavity 14) as well as at least one connecting component 24 integrally molded thereon, which connecting component 24 corresponds to the half-shell-type area 18.

Figure 2:
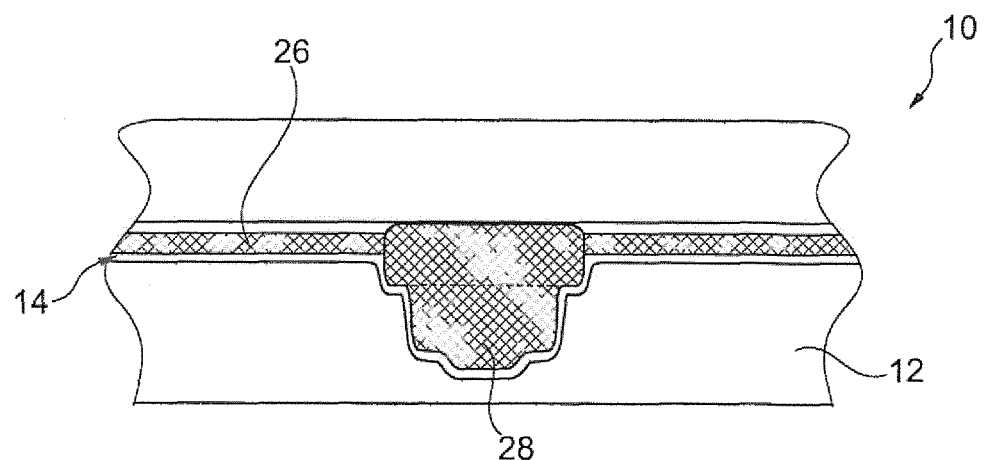
FIG. 2 is a schematic top view of the molding tool half of FIG. 1 after the introduction of a textile reinforcing material.

For producing the structural subassembly 20, a textile reinforcing material in the form of a first textile semi-finished product 26 for the profile component 22 as well as a second textile semi-finished product 28 for the connecting component 24 is placed in the cavity 14, in which case, the textile semi-finished products 16 and 28 mutually contact and overlap in the mold 10 or the cavity 14, in that the textile semi-finished product 28 rests on the textile semi-finished product 26 (see FIG. 2). The textile semi-finished products 26, 28 are so-called fiber preforms, for example, made of textile braid.

Figure 3:
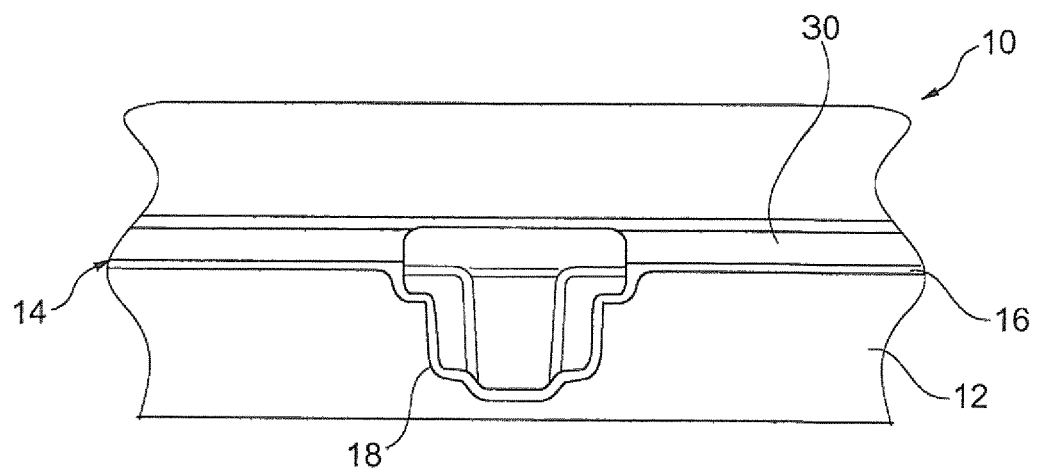
FIG. 3 is a schematic top view of the molding tool half of FIG. 2 after the introduction of the flowable plastic material.

The mold 10 is closed and, by way of a defined sprue system, a flowable plastic material 30 is injected under pressure into the sealed-off and, as required, previously evacuated mold 10. The plastic material 30 saturates the dried fibers of the textile semi-finished products 26, 28 (FIG. 3). The two semi-finished products 26, 28 are mutually connected by the plastic material 30. The connecting component 24 is therefore connected directly with the profile component 22.

After the hardening and/or cooling of the plastic material 30 and, as required, a slight post-processing, the finished structural subassembly 20 illustrated in FIG. 4 and consisting of the profile component 22 with the "resined" (in the case of a duroplastic material) connecting component 24, can be removed from the mold 10.

The connecting component 24 has an indentation 32 for receiving a further profile component not shown in the figures and thereby forms a half-shell for a node connection of the profile component 22 with the additional profile component.

As an alternative to the described injection method 32, the so-called Resin Transfer Molding (RTM), naturally also any other common method for producing fiber-reinforced plastic is contemplated, for example, an infusion process in a vacuum.

Significant advantages of the method according to the invention are the reduced mounting expenditures, the reduction of individual process steps as well as the increase of mechanical properties of the structural subassembly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a structural subassembly for a motor vehicle having at least one first profile component of fiber-reinforced plastic and at least one connecting component for producing a node connection of the first profile component with a further profile component, the method comprising the acts of:
   a) providing a mold having at least one mold half, which has a cavity which corresponds essentially to the first profile component to be produced with at least one connecting component molded on in one piece;
   b) placing a multi-piece textile reinforcing material in the mold;
   c) introducing a flowable plastic material under vacuum into the mold wherein the multi-piece textile reinforcing material is saturated by the flowable plastic material;
   d) hardening and/or cooling the plastic material, wherein the multi-piece textile reinforcing material has a first textile semi-finished product for the profile component as well as at least a second textile semi-finished product for the connecting component both of which touch and overlap in the mold,
   the first textile semi-finished product and the second textile semi-finished product are fiber preforms,
   the at least one connecting component of the node connection has one shell part into which one or more further profile components are insertable,
   inserting at least one further profile component into the one shell part to thereby complete the connection, and
   the at least one connecting component of the node connection is produced in one piece with the profile component in a single production process that takes place in the mold; and
   e) placing two shell parts together to form a cavity, which comes together to enclose therewithin the further profile component of the motor vehicle.

2. The method according to claim 1, wherein the textile semi-finished products are mutually connected by the plastic material.

3. The method according to claim 1, wherein
the cavity has a defined sprue system.

4. The method according to claim 1, wherein the act (c) takes place by an infusion method.

5. The method according to claim 4, wherein the infusion method occurs with a vacuum in the mold.

6. The method according to claim 1, wherein
the mold has two mold halves which form the cavity in the closed condition.

7. The method according to claim 6, wherein the act (c) takes place by an injection process.

8. The method according to claim 7, wherein the injection process is a resin transfer molding process.

\* \* \* \* \*